United States Patent [19]

Verser et al.

[11] Patent Number: 5,633,342

[45] Date of Patent: May 27, 1997

[54] METHOD FOR THE SYNTHESIS OF ENVIRONMENTALLY DEGRADABLE BLOCK COPOLYMERS

[75] Inventors: Dan W. Verser, Golden; Kevin H. Schilling; Xiaomao Chen, both of Arvada, all of Colo.

[73] Assignee: Chronopol, Inc., Golden, Colo.

[21] Appl. No.: 549,567

[22] Filed: Oct. 27, 1995

[51] Int. Cl.$^6$ ........................................ C07K 1/00
[52] U.S. Cl. .................. 528/355; 528/354; 528/359; 528/361; 528/365; 528/370; 528/371
[58] Field of Search ........................ 528/354, 355, 528/359, 365, 361, 370, 371

[56] References Cited

U.S. PATENT DOCUMENTS

| | | | |
|---|---|---|---|
| 4,137,921 | 2/1979 | Okuzumi et al. | 128/335.5 |
| 4,157,437 | 6/1979 | Okuzumi et al. | 528/354 |
| 4,243,775 | 1/1981 | Rosensaft et al. | 525/415 |
| 4,300,565 | 11/1981 | Rosensaft et al. | 128/335.5 |
| 4,429,080 | 1/1984 | Casey et al. | 525/415 |
| 4,605,730 | 8/1986 | Shalaby et al. | 528/357 |
| 4,643,191 | 2/1987 | Bezwada et al. | 128/335.5 |
| 4,653,497 | 3/1987 | Bezwada et al. | 128/335.5 |
| 4,700,704 | 10/1987 | Jamiolkowski et al. | 128/335.5 |
| 4,788,979 | 12/1988 | Jarrett et al. | 128/335.5 |
| 4,838,267 | 6/1989 | Jamiolkowski et al. | 128/335.5 |
| 5,028,667 | 7/1991 | McLain et al. | 525/415 |
| 5,080,665 | 1/1992 | Jarrett et al. | 606/219 |
| 5,210,108 | 5/1993 | Spinu et al. | 521/182 |
| 5,252,701 | 10/1993 | Jarrett et al. | 528/354 |
| 5,342,395 | 8/1994 | Jarrett et al. | 606/219 |
| 5,470,340 | 11/1995 | Bezwada et al. | 606/230 |

FOREIGN PATENT DOCUMENTS

WO94/11441 5/1994 WIPO.

OTHER PUBLICATIONS

A. Hamitou, et al., "Soluble Bimetallic μ-Oxoalkoxides. IX. ε-Caprolactone and β-Propiolactone Block Copolymerization", *Journal of Polymer Science*, vol. 15, pp. 1035–1041 (1977).

X.D. Feng et al., "Synthesis and Evaluation of Biodegradable Block Copolymers of ε-Caprolactone and D L–Lactide", *Journal of Polymer Science*, vol. 21, pp. 593–600 (1983).

C.X. Song et al., "Synthesis of ABA Triblock Copolymers of ε-Caprolactone and DL–Lactide", *Macromolecules*, vol. 17, pp. 2764–2767 (1984).

Grijpma, et al., "Star-shaped polylactide-containing block copolymers", *Makromol. Chem. Rapid Commun.*, vol. 14, pp. 155–161 (1993).

Grijpma, et al., "Rubber Toughening of Poly(Lactide) by Blending and Block Copolymerization", *Polymer Engineering and Science*, vol. 34, No. 22, pp. 1674–1684 (1994).

Joziasse, et al., "Supertough poly(lactide)s", *Polymer Bulletin*, vol. 33, pp. 599–605 (1994).

Löfgren, et al., "Synthesis and Characterization of Biodegradable Homopolymers and Block Copolymers Based on 1,5-Dioxepan-2-one", *Macromolecules*, vol. 27, No. 20, pp. 5556–5562 (1994).

Dijkstra, et al., "Block Copolymers of L–Lactide, D–Lactide and ε–Caprolactone", 17th Annual Meeting of the Society for Biomaterials, p. 184, (1991).

Zhang, et al., "Mechanism of Lactide Polymerization in the Presence of Stannous Octoate: The Effect of Hydroxy and Carboxylic Acid Substances", *Journal of Polymer Science, Part A, Polymer Chemistry*, vol. 32, pp. 2965–2970 (1994).

*Primary Examiner*—Melvyn I. Marquis

[57] ABSTRACT

A method is provided for the synthesis of environmentally degradable block copolymers which includes the sequential polymerization of polymer-forming materials in the presence of one or more polymerization reaction accelerants and catalysts. The accelerants are a class of hydrogen-labile compounds which act as polymerization initiators and accelerate the polymerization rate significantly. The environmentally degradable block copolymers produced include those comprising segments of polymers of alkylene oxides, trimethylene carbonates, lactones and cyclic esters of hydroxycarboxylic acids.

51 Claims, 3 Drawing Sheets

5,633,342

METHOD FOR THE SYNTHESIS OF ENVIRONMENTALLY DEGRADABLE BLOCK COPOLYMERS

FIELD OF THE INVENTION

The present invention relates to a method for synthesizing environmentally degradable block copolymers. In particular, the present invention includes a sequential method of at least two steps for polymerizing two or more polymer-forming materials in the presence of a catalyst and polymerization accelerant for synthesizing environmentally degradable block copolymers.

BACKGROUND OF THE INVENTION

Block copolymers, i.e., polymers comprised of segments of two or more polymers linked to one another, can be synthesized from two or more base monomers in order to obtain a polymer having physical properties which are different from those of the constituent polymers. For example, a hard, brittle polymer with a high tensile strength can be copolymerized with a soft, elastomeric polymer having low glass transition temperature ($T_g$) and low modulus in order to obtain a block copolymer having hard and soft segments which is both elastomeric and has a high tensile strength. Such block copolymers can be more suitable for uses, such as plastic bags and packaging films, than homopolymers synthesized from the constituent polymers.

U.S. Pat. No. 5,342,395 by Jarrett et al., issued Aug. 30, 1994, and assigned to American Cyanamid Company discloses a method for producing block copolymers of lactide and ε-caprolactone, which consist of up to about 20 mole % ε-caprolactone. Jarrett et al. disclose that ε-caprolactone can be polymerized in the presence of diethylene glycol and stannous octoate in a nitrogen purged stirred reactor maintained at 200° C. until maximum viscosity is achieved, after which time lactide is added to the reactor in order to produce the block copolymer. The entire process for producing the block copolymer purportedly takes between 3 and 4 hours, after which the products are ground and dried under a vacuum for an additional 12 to 18 hours at 100° C. and 0.2 mm Hg to remove the unreacted monomers.

There are, however, a number of disadvantages to known processes for producing block copolymers. Most processes are commercially or economically unacceptable because of the length of time it takes to complete the block copolymerization reaction. Also, the relatively high polymerization temperatures used in known processes, i.e., temperatures up to and in excess of 200° C., can lead to color formation in the block copolymer produced due to the prolonged reaction time.

Accordingly, it would be desirable to provide fast and efficient methods for producing environmentally degradable block copolymers which are commercially and economically acceptable. It would be desirable to provide methods for producing environmentally degradable block copolymers which do not result in excessive color formation in the block copolymers produced.

SUMMARY OF THE INVENTION

One aspect of the present invention is to provide fast and efficient methods for producing block copolymers, preferably environmentally degradable block copolymers, which are commercially and economically acceptable and which do not result in excessive color formation in the environmentally degradable block copolymers produced.

It is a further aspect of the present invention to provide methods for synthesizing environmentally degradable block copolymers which allow control over the properties of the block copolymers produced for specific end-uses.

It is yet a further aspect of the present invention to provide methods for synthesizing environmentally degradable block copolymers which give a high conversion of the constituent monomers.

In accordance with the present invention, a method is provided for the synthesis of environmentally degradable block copolymers which includes the sequential addition of polymer-forming materials to a polymerization reactor and the addition of one or more catalysts and one or more polymerization reaction accelerants as defined more fully below. Environmentally degradable block copolymers produced include those having soft and hard segments in both branched and star-shaped configurations.

Suitable polymer forming materials include, but are not limited to, alkylene oxides, trimethylene carbonates, lactones, and cyclic esters of hydroxycarboxylic acids such as lactide and glycolide.

Suitable catalysts include, but are not limited to, tin, aluminum, yttrium and lanthanum based metal catalysts and mixtures thereof.

Suitable polymerization accelerants include, but are not limited to, hydrogen-labile compounds such as alcohols, amino alcohols, diols, polyols, monoamino compounds, polyamino compounds and mixtures thereof.

DETAILED DESCRIPTION

Figure 1:
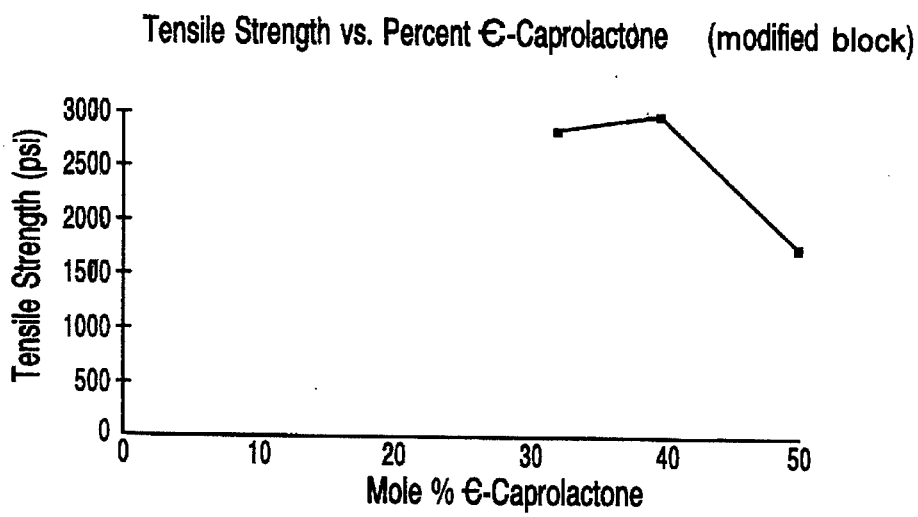
FIG. 1 is a graphical representation of the tensile strength for various overall compositions of environmentally degradable block copolymers of ε-caprolactone and lactide synthesized according to the method of the present invention, using a pre-copolymer of ε-caprolactone:lactide having a molar ratio of 80:20.

The present invention is directed to a method for synthesizing environmentally degradable block copolymers. The phrase "environmentally degradable," as used herein, refers to block copolymers capable of being at least about 98 percent, and preferably about 100 percent, hydrolytically degraded after discard. The environmentally degradable block copolymers are preferably at least about 98 percent hydrolytically degraded, and more preferably about 100 percent hydrolytically degraded, within about ten years, more preferably within about five years, and even more preferably within about three years. The environmentally degradable block copolymers can also be degraded by other mechanisms such as biological, chemical, mechanical, photo, and thermal degradation.

Preferably, the environmentally degradable block copolymers of the present invention can be distinguishable from biodegradable plastics which are used in the body (e.g., sutures, implants, and drug delivery devices), which are designed to undergo substantial, and often controlled, degradation during use. In contrast, it is preferred that an environmentally degradable block copolymer of the present invention begins accelerated degradation after disposal, having exhibited only a minor amount of degradation during its operational lifetime.

The methods for synthesizing environmentally degradable block copolymers according to the present invention will now be described in more detail with respect to the synthesis of an environmentally degradable block copolymer comprised of two distinct polymer segments. It is to be understood, however, that the methods of the present invention described below can be extended for the synthesis of environmentally degradable block copolymers containing three or more distinct polymer segments.

Although various polymerization techniques, such as solution polymerization and melt polymerization, can be used successfully to synthesize environmentally degradable block copolymers according to the present invention, it is preferred that melt polymerization be used. Melt polymerization is preferred because the material costs for melt polymerization are reduced relative to those for solution polymerization. In particular, when using melt polymerization techniques the amount of by-products and wastes produced are typically minimized. Also, when using melt polymerization, less equipment is needed because there is no solvent to be removed from the synthesized block copolymers and treated or otherwise handled. As a result, melt polymerization generates less volatile organics than solution polymerization, making melt polymerization a technically less complicated and more environmentally sound process than solution polymerization.

The methods of the present invention for synthesizing environmentally degradable block copolymers include providing a first polymer-forming material to a suitable polymerization reactor and polymerizing the first polymer-forming material in the presence of a catalyst and a polymerization accelerant to form a first polymer. The method of the present invention further includes combining a second polymer-forming material, a second catalyst and a second polymerization accelerant with the first polymer produced and polymerizing the second polymer-forming material. Incorporation of a polymerization accelerant in the second polymerization step has been surprisingly found to substantially increase the polymerization rate of the second polymer-forming material, reducing the polymer melt residence time in the polymerization reactor, and ultimately, substantially eliminates color formation in the block copolymers produced. Moreover, by varying the ratio of the catalyst to the polymerization accelerant that are added to the reaction, the reaction times for a desired conversion of monomers for a resultant block copolymer can be reduced.

The environmentally degradable block copolymers produced include branched and star-shaped block copolymers which preferably include hard and soft polymer segments. The soft polymer segments are segments made of the first polymer, and the hard segments are made of a polymer which contains repeating units of the second polymer-forming material. However, the hard segments can also include a portion of the first polymer-forming material incorporated with the second polymer-forming material. The environmentally degradable block copolymer compositions formed typically also contain, unless removed, amounts of homopolymers of repeating units of the first and/or second polymer-forming materials. It is not always desirable or necessary to remove such homopolymers from the resulting block copolymer. Surprisingly, it has been found that the block copolymers produced act as compatabilizers for the homopolymers, such that the resultant mixture is substantially uniform in appearance and properties. Suitable polymerization reactors include batch reactors such as continuously stirred tank reactors, continuous reactors such as single or twin-screw extruders, and combinations of batch and continuous reactors. Reactors capable of high energy mixing, such as twin-screw extruders, are particularly useful as polymerization reactors in the present invention. Such extruders allow for continuous polymerization and more accurate temperature control over the polymerization than typical batch polymerization reactors, particularly when the polymerization reaction is exothermic. Extruders are further preferred as polymerization reactors because they are capable of operation with very low to very high viscosity polymer melts.

Polymer-forming materials which are suitable for use in the present invention include those polymer-forming materials which form hard or soft polymer segments when polymerized. Preferred for use as a first polymer-forming material in the present invention are materials which form soft or rubbery segments when polymerized, such as those materials having glass transition temperatures ($T_g$) less than about 10° C., and preferably less than about 0° C. Such first polymer-forming materials include, but are not limited to, alkylene oxides, trimethylene carbonates, lactones, and mixtures thereof. More preferred first polymer-forming materials are trimethylene carbonate, ethylene glycol and lactones, including, but not limited to ε-caprolactone, δ-valerolactone, p-dioxanone and mixtures thereof.

Even more preferred as a first polymer-forming material are pre-copolymer materials, particularly when it is desired to control the physical and chemical properties of the environmentally degradable block copolymers synthesized. For example, a pre-copolymer material can comprise a first polymer-forming material and an additional polymer-forming material such that when polymerized, the first polymer is a copolymer having reduced crystallinity relative to a homopolymer of the first polymer-forming material. As a result, environmentally degradable block copolymers formed using the pre-copolymer as a first polymer forming material generally have different properties than those environmentally degradable block copolymers having the same overall molar ratio of polymer-forming materials, but were not synthesized using the pre-copolymer. Further, in some instances the block copolymers synthesized using pre-copolymer materials have characteristics which cannot be attained by synthesizing block copolymers from the same constituents without first forming the pre-copolymer material. Accordingly, the use of a pre-copolymer is very important in synthesizing block copolymers with desired characteristics.

Figure 2:
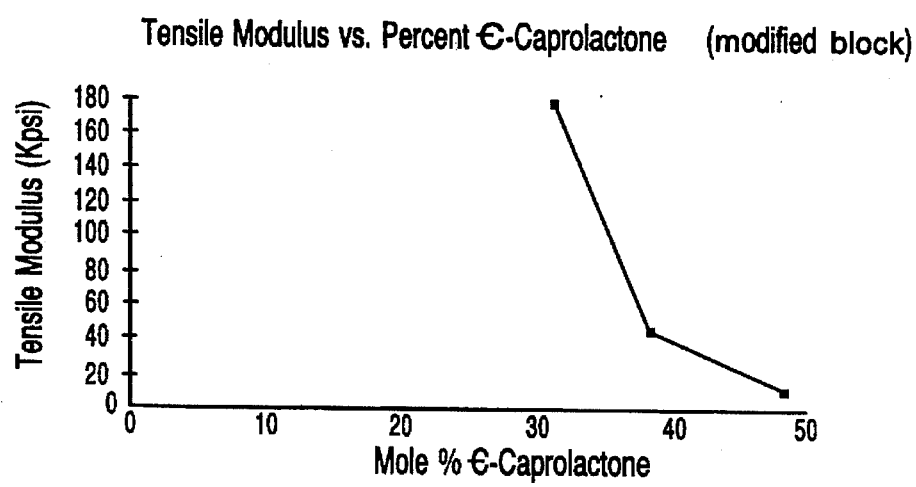
FIG. 2 is a graphical representation of the tensile moduli for various overall compositions of environmentally degradable block copolymers of ε-caprolactone and lactide synthesized according to the method of the present invention, using a pre-copolymer of ε-caprolactone:lactide having a molar ratio of 80:20.
Figure 3:
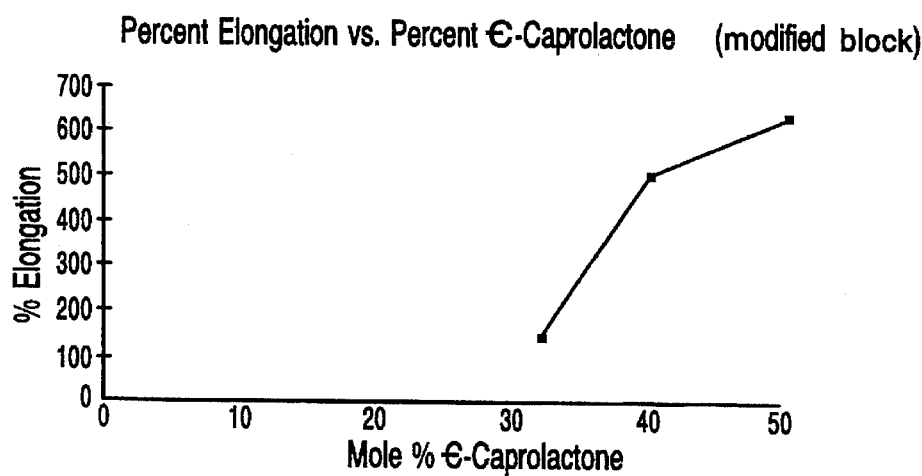
FIG. 3 is a graphical representation of the percent elongation for various overall compositions of environmentally degradable block copolymers of ε-caprolactone and lactide synthesized according to the method of the present invention, using a pre-copolymer of ε-caprolactone:lactide having a molar ratio of 80:20.
Figure 4:
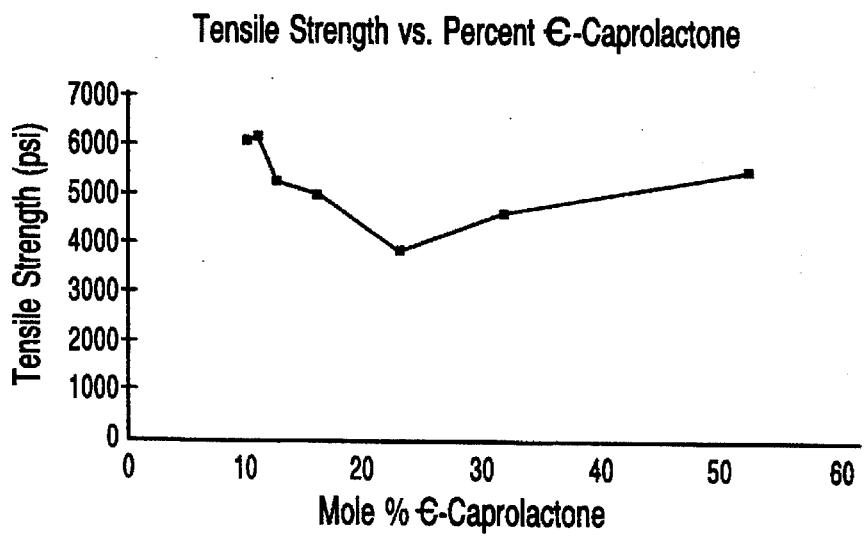
FIG. 4 is a graphical representation of the tensile strength for various overall compositions of environmentally degradable block copolymers of ε-caprolactone and lactide synthesized according to the methods of the present invention without use of a pre-copolymer as the first polymer-forming material.
Figure 5:
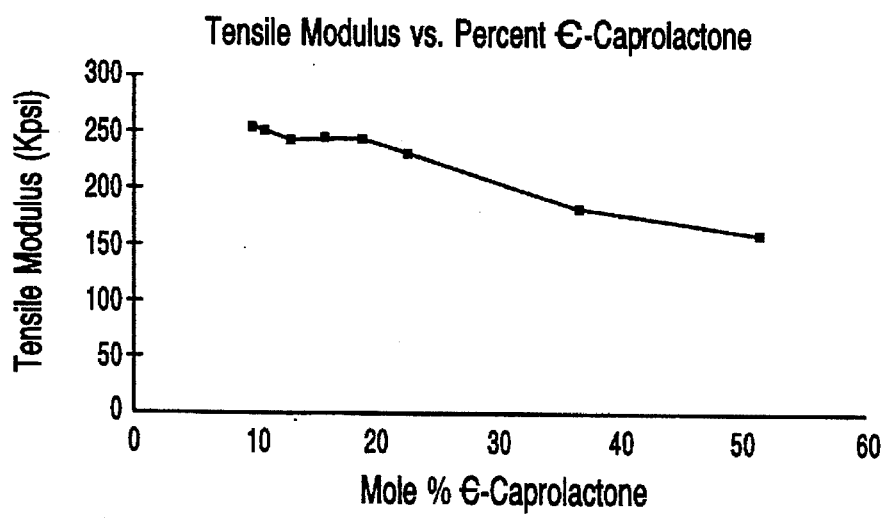
FIG. 5 is a graphical representation of the tensile moduli for various overall compositions of environmentally degradable block copolymers of ε-caprolactone and lactide synthesized according to the methods of the present invention without use of a pre-copolymer as the first polymer-forming material.
Figure 6:
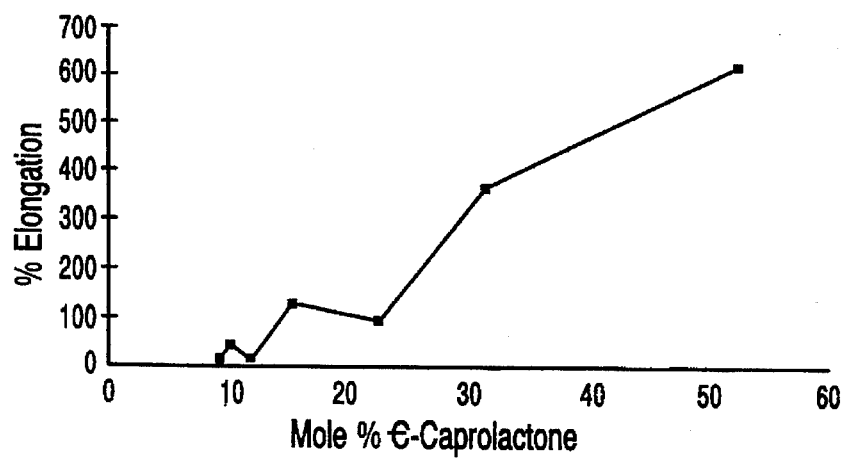
FIG. 6 is a graphical representation of the percent elongation for various overall compositions of environmentally degradable block copolymers of ε-caprolactone and lactide synthesized according to the methods of the present invention without use of a pre-copolymer as the first polymer-forming material.

The described ability to control the properties of the synthesized block copolymers using varying amounts of the constituent polymer-forming materials and pre-copolymer materials is illustrated in FIGS. 1–3. FIGS. 1–3 are graphical representations of the tensile strength, tensile modulus, and percent elongation, respectively, for various overall compositions of environmentally degradable block copolymer of ε-caprolactone and lactide synthesized using a pre-copolymer of ε-caprolactone:lactide having a molar ratio of 80:20. FIGS. 4–6 are graphical representations of the tensile strength, tensile modulus, and percent elongation, respectively, for various overall compositions of environmentally degradable block copolymer of ε-caprolactone and lactide synthesized without using a pre-copolymer as the first polymer-forming material. As can be seen from a comparison of FIGS. 1 and 4, for the same overall molar ratios of ε-caprolactone:lactide, the two environmentally degradable block copolymers have very different tensile strengths. At about a 40 mole % ε-caprolactone content, the block copolymer in FIG. 1 has a tensile strength of about 3,000 psi compared to a tensile strength of about 5,000 psi for the block copolymer in FIG. 4. As can be seen from a comparison of FIGS. 2 and 5, for the same overall molar ratios of ε-caprolactone:lactide, the two environmentally degradable block copolymers have very different moduli. At about a 40 mole % ε-caprolactone content, the block copolymer in FIG. 2 has a tensile modulus of about 46 kpsi compared to a tensile modulus of about 180 kpsi for the block copolymer in FIG. 5. Similarly, as can be seen from a comparison of FIGS. 3 and 6, for the same overall molar ratios of ε-caprolactone:lactide, the two environmentally degradable block copolymers have very different percent elongation. At about a 32 mole % ε-caprolactone content, the block copolymer in FIG. 3 has a percent elongation of about 130% compared to a percent elongation of about 380% for the block copolymer in FIG. 6.

Also illustrated by FIGS. 2 and 5, is that through the use of a pre-copolymer when synthesizing block copolymers, the constituent polymer materials can be used more efficiently to produce desired characteristics in the resultant block copolymer. For example, at about 40 mole % ε-caprolactone content, the block copolymer synthesized using a pre-copolymer in FIG. 2 has a tensile modulus within the range of from about 40 kpsi to about 50 kpsi. By comparison, the block copolymer in FIG. 5, even at about 50 mole % ε-caprolactone content, does not have a tensile modulus within the range of from about 40 kpsi to about 50 kpsi. Accordingly, when softness is a desired characteristic in the block copolymer, less ε-caprolactone needs to be used to achieve the desired characteristics when a pre-copolymer is used to synthesize the block copolymer.

Preferred for use as pre-copolymer materials include, but are not limited to, mixtures of cyclic esters of hydroxycarboxylic acids with alkylene oxides, trimethylene carbonates and lactones. More preferred for use as pre-copolymer materials include, but are not limited to, mixtures of cyclic esters of hydroxycarboxylic acids with trimethylene carbonate, ethylene glycol and lactones, including, but not limited to, ε-caprolactone, δ-valerolactone and p-dioxanone. Preferred cyclic esters of hydroxycarboxylic acids include, but are not limited to, lactide and glycolide. Examples of other suitable cyclic esters include certain of the cyclic esters disclosed in copending U.S. patent application Ser. No. 08/127,907, filed Sep. 27, 1993, entitled "DEGRADABLE POLYDIOXANEONE-BASED MATERIALS". Even more preferred for use as pre-copolymer materials include, but are not limited to, mixtures of lactide with ε-caprolactone.

When lactide and ε-caprolactone are used to form a random copolymer as the first polymer, it is desirable to combine lactide with the ε-caprolactone in amounts up to about 40 mole %, and preferably in amounts in the range of from about 20 mole % to about 25 mole %. Concentrations above about 40 mole % lactide in the copolymer raises the glass transition temperature of the copolymer above about 0° C., making it less desirable as a first polymer when softness of the resultant block copolymer is desired.

To enhance the polymerization rate of the first polymer-forming material, a catalyst is added to the first polymer-forming material in the polymerization reactor. The term "catalyst," as used herein, refers to metal-containing compounds which are capable of increasing the polymerization rate of a polymer-forming material. Although the term "catalyst" typically refers to materials which are not consumed in a chemical reaction, the term "catalyst" is used herein even though is not currently understood whether the described metal-containing compounds are consumed in the polymerization reaction.

Typically, the catalyst which is used depends upon the choice of the polymer-forming material with which it will be combined. For example, it is desirable to use a catalyst which is compatible with the polymer-forming material and does not substantially degrade the polymer-forming material or the polymers formed from such materials during processing. Additionally, it is desirable to use a catalyst which is non-toxic. Suitable catalysts include, but are not limited to, tin, aluminum, yttrium and lanthanum based metal catalysts. Preferred for use as catalysts are stannous octoate (Sn(Oct)$_2$), yttrium or lanthanide series rare earth metal catalysts as are described in U.S. Pat. No. 5,028,667 by McLain et al., issued Jul. 2, 1991, and mixtures thereof. More preferred for use as a catalyst is stannous octoate.

The amount of the catalyst to be combined with the first polymer-forming material can depend upon the amount of the first polymer-forming material present, the toxicity of the catalyst in a finished product and in the environment after degradation of the product and to what extent, if any, the catalyst can degrade the polymers produced if too much catalyst is present during processing of the polymers. In most cases, the amount of catalyst added to the first polymer-forming material is less than about 1,000:1 moles first polymer-forming material:moles catalyst, preferably less than about 2,000:1 moles first polymer-forming material:moles catalyst, and more preferably less than about 2,500:1 moles first polymer-forming material:moles catalyst.

To further enhance the polymerization rate of the first polymer-forming material and initiate the formation of the environmentally degradable block copolymers, a polymerization accelerant is also combined with the first polymer-forming material and catalyst in the polymerization reactor. The phrase "polymerization accelerant," as used herein, refers to compounds which act as polymerization initiators (i.e., those compounds capable of providing chain propagating centers), thereby also accelerating the rate of polymerization, and are consumed in the polymerization reaction.

Typically, the polymerization accelerant which is used depends upon the choice of the polymer-forming material and catalyst with which it will be combined. For example, it is desirable to use a polymerization accelerant which is compatible with the polymer-forming material and catalyst and does not substantially degrade or assist in the degradation of the polymer-forming material or the polymers formed from such materials, such as during processing. Additionally, it is desirable to use a polymerization accelerant which is non-toxic. Further, the type of block copolymers produced, branched or star-shaped, is determined by the polymerization accelerant used. Accordingly, the choice of polymerization accelerant can also depend upon the type of block copolymer desired.

Suitable polymerization accelerants include, but are not limited to, hydrogen-labile compounds such as alcohols, amino alcohols, diols, polyols, monoamino compounds, polyamino compounds and mixtures thereof. Preferred polymerization accelerants are polyols, including, but not limited to, glycerol, poly($\epsilon$-caprolactone) triol and mixtures thereof. In general, star-shaped block copolymers are produced when polyols are used as the polymerization accelerant.

The type and amount of the polymerization accelerant to be combined with the first polymer-forming material can depend upon the desired final number average molecular weight ($M_n$) and weight average molecular weight ($M_w$) of the synthesized environmentally degradable block copolymers. It has been found that the polymerization accelerant can affect the $M_n$ and $M_w$ of the resulting environmentally degradable block copolymers. While not fully understood, the effect of the polymerization accelerant on the $M_n$ and $M_w$ of the synthesized block copolymers appears to be dependent upon the number of chain propagating centers on a single molecule of a polymerization accelerant. While not intending to be bound by theory, it is believed that the greater the number of chain propagating centers on a single molecule of a polymerization accelerant, the higher the final $M_n$ and $M_w$ of the resulting environmentally degradable block copolymers. For example, when polyols are used as the polymerization accelerant and the propagating centers are the OH groups on the accelerant molecules, it is observed that for a given hydroxyl ([OH]) group concentration, the $M_n$ and $M_w$ of the resulting block copolymers are higher than for block copolymers synthesized using an alcohol as a polymerization accelerant.

In most cases, the amount of polymerization accelerant added to the first polymer-forming material is less than about 200:1 moles first polymer-forming material:moles polymerization accelerant, preferably less than about 300:1 moles first polymer-forming material:moles polymerization accelerant, and more preferably less than about 500:1 moles first polymer-forming material:moles polymerization accelerant.

Polymerization of the first polymer-forming material can be carried out at a suitable temperature and pressure to obtain a first polymer material. It is desirable, however, that the temperature of the polymerization reaction be maintained within a temperature range which minimizes degradation of and color formation in the polymer being produced. Typically, such polymerization temperatures are within the range of about 150° C. to about 210° C. Preferred temperature ranges can depend upon the polymer-forming material being polymerized and the polymerization accelerant being used. In most cases, however, it is preferred that the polymerization temperature be maintained within the range of about 160° C. to about 200° C., and more preferably at a temperature within the range of about 170° C. to about 190° C. If desired, the polymerization reaction can be carried out under inert atmospheric conditions, such as under a blanketing gas, to prevent moisture contamination which degrades the polymers being produced and to prevent contact of the polymerization mass with oxygen which can oxidize the polymers being produced. Such blanketing gases include, but are not limited to argon and nitrogen.

The time required for substantial completion of the first polymerization reaction depends upon the polymerization rate for the first polymer-forming material, which in turn depends upon the polymerization reaction parameters, including, but not limited to the catalyst used, the polymerization accelerant used and the polymerization temperatures and pressures. A convenient method of determining the extent of completion of the polymerization reaction is by measuring the melt viscosity of the polymerization mass in the polymerization reactor. When maximum melt viscosity is achieved, the polymerization reaction is typically complete. Typically, the time it takes for a first polymer-forming material to reach maximum melt viscosity is within the range of about 10 minutes to about 65 minutes, preferably the time it takes for a first polymer-forming material to reach maximum melt viscosity is within the range of about 10 minutes to about 40 minutes, and more preferably the time it takes for a first polymer-forming material to reach maximum melt viscosity is within the range of about 10 minutes to about 30 minutes.

An important feature of the first polymerization step is that the chains of the first polymer formed during polymerization are "living," i.e., they are reactive and able to continue to be polymerized. As a result, block copolymers can be formed by combining the first polymer with a second polymer-forming material. Accordingly, after the first polymer material has been synthesized, a second polymer-forming material can be added to the first polymer in the same or an additional polymerization reactor. Though not necessary, it is desirable that the second polymer-forming material be capable of being polymerized at or near about the same polymerization parameters (i.e., temperatures, pressures, etc.) as the first polymer-forming material. It is also desirable that the second polymer-forming material is not substantially degradable by the catalyst or polymerization accelerant utilized in conjunction with the polymerization of the first polymer-forming material.

Polymer-forming materials which are suitable for use in the present invention as a second polymer-forming material include those polymer-forming materials which form hard or soft polymer segments when polymerized. Preferred for use as second polymer-forming materials in the present invention are polymers which form hard segments when polymerized. Such second polymer-forming materials include, but are not limited to cyclic esters of hydroxycarboxylic acids. More preferred materials for use in the present invention as second polymer-forming materials include lactide and glycolide. Even more preferred for use in the present invention as a second polymer-forming material is lactide. As used herein, the term "lactide" refers to the various isomeric forms of lactide, including, L-lactide, D-lactide, L,D-lactide and meso-lactide (M-lactide). When lactide is used as a second polymer-forming material, the amounts of the various isomeric forms of lactide used can be varied to control the stereoregularity of the polylactide segments in the synthesized environmentally degradable block copolymers. Alternatively, the second polymer-forming material can also include up to about 5 mole % $\epsilon$-caprolactone.

The amount of the second polymer-forming material added to the polymerization reactor depends upon the characteristics that are desired in the block copolymers to be produced. For example, to increase the elastomeric and percent elongation qualities of the preferred environmentally degradable block copolymers of lactide and ε-caprolactone, it is desirable to increase the molar content of the ε-caprolactone to greater than about 5 mole % relative to lactide in the resulting block copolymer. Preferably, however, the environmentally degradable block copolymers of lactide and ε-caprolactone contain in the range of from about 10 mole % to about 75 mole % ε-caprolactone. In general, to create a true block copolymer, enough of each polymer forming material must be added to the polymerization reactor for the resulting block copolymers to contain greater than about 5 mole %, and preferably greater than about 10 mole %, of each polymer-forming material.

Similar to the first polymerization reaction, a catalyst, as previously described is combined with the second polymer-forming material in order to enhance the rate of production of block copolymers. In a preferred embodiment of the present invention, the catalyst combined with the second polymer-forming material is an additional amount of the same catalyst combined with the first polymer-forming material.

The amount of the catalyst to be combined with the second polymer-forming material depends upon similar criteria used to determine the amount of catalyst combined with the first polymer-forming material, as previously described. In addition, consideration as to the type and concentration of catalyst already present in the first polymer can effect the determination as to the amount of catalyst to be combined with the second polymer-forming material. In most cases, the amount of catalyst combined with the second polymer-forming material is less than about 1,000:1 moles second polymer-forming material:moles catalyst, preferably less than about 2,000:1 moles second polymer-forming material:moles catalyst, and more preferably less than about 4,000:1 moles second polymer-forming material:moles catalyst.

A polymerization accelerant, as described previously, is also combined with the second polymer-forming material in the polymerization reactor. In a preferred embodiment of the present invention, the polymerization accelerant combined with the second polymer-forming material and catalyst is an additional amount of the same polymerization accelerant combined with the first polymer-forming material.

The amount of the polymerization accelerant to be combined with the second polymer-forming material depends upon similar criteria used to determine the amount of polymerization accelerant combined with the first polymer-forming material, as previously described. However, additional consideration must be given as to the type and concentration of polymerization accelerant and catalyst already present in the first polymer, because these factors can effect the determination as to the amount of polymerization accelerant to be combined with the second polymer-forming material. In most cases, the amount of polymerization accelerant added to the polymerization reactor and combined with the second polymer-forming material is less than about 200:1 moles second polymer-forming material:moles polymerization accelerant, preferably less than about 300:1 moles second polymer-forming material:moles polymerization accelerant, and more preferably less than about 500:1 moles second polymer-forming material:moles polymerization accelerant.

After combining the second polymer-forming material and a polymerization accelerant in the polymerization reactor with the first polymer, polymerization can be carried out at a suitable temperature and pressure to obtain a block copolymer material. It is desirable, however, that the temperature and pressure of the polymerization reaction be maintained within temperature and pressure ranges which minimize degradation of and color formation in the block copolymer being produced. Typically, such polymerization temperatures are within the range of about 150° C. to about 210° C. Preferred temperature ranges can depend upon the polymer-forming material being polymerized and the polymerization accelerant being used. In most cases, however, it is preferred that the polymerization temperature be maintained within the range of about 160° C. to about 200° C., and more preferably at a temperature within the range of about 170° C. to about 190° C. If desired, the polymerization reaction can be carried out under inert atmospheric conditions, such as under a blanketing gas, to prevent moisture contamination which degrades the polymers being produced and to prevent contact of the polymerization mass with oxygen which can oxidize the polymers being produced. Such blanketing gases include, but are not limited to, argon and nitrogen.

The time required for the block copolymerization reaction to go to substantial completion depends upon the polymerization rate for the second polymer-forming material, which in turn depends upon the polymerization reaction parameters, including, but not limited to the polymerization accelerants and catalysts used and the polymerization temperatures. As stated previously, a convenient method of determining the extent of completion of the polymerization reaction is by measuring the melt viscosity of the polymerization mass in the polymerization reactor, and when maximum melt viscosity is achieved, the polymerization reaction is typically complete. Typically, the time it takes for the block copolymer mass to reach maximum melt viscosity is within the range of about 30 minutes to about 120 minutes, preferably is within the range of about 30 minutes to about 100 minutes, and more preferably is within the range of about 30 minutes to about 90 minutes. Accordingly, the total amount of time it takes to produce the environmentally degradable block copolymers is typically within the range of from about 40 minutes to about 170 minutes, preferably within the range of from about 40 minutes to about 130 minutes, and more preferably within the range of about 40 minutes to about 120 minutes.

The time with which it takes in order to produce block copolymers according to the present invention is an important aspect of the present invention. In contrast to known processes for producing block copolymers, the method described herein allows for the economical production of block copolymers due to the increased reaction rates, and without significant loss in weight average or number average molecular weight of the resulting block copolymer. The resulting reduced reaction times allow for the production of a final block copolymer that has substantially no color formation.

Typically, the conversion of the polymer-forming materials during polymerization of the block copolymers is in the range of from about 90% to about 98%, and preferably in the range of from about 92% to about 98%. As a result of the high conversion of the polymer-forming materials, little of the polymer-forming materials are wasted. Further, less of the polymer-forming materials remain in the synthesized block copolymer which may need to be removed.

In general, the environmentally degradable block copolymers synthesized have number average molecular weights ($M_n$) in the range of from about 60,000 to about 150,000 and weight average molecular weights ($M_w$) in the range of from about 120,000 to about 300,000. In addition, such block copolymers typically exhibit at least two glass transition temperatures ($T_g$) which are representative of each of the polymers which comprise the block copolymer.

Following synthesis according to the methods of the present invention, the environmentally degradable block copolymers can be treated in order to remove residual monomers and other impurities in the environmentally degradable block copolymers in order to render them suitable for their intended use. Such treatments include, but are not limited to grinding of the block copolymer mass and subsequently drying the ground block copolymer mass to evolve undesired contaminants. In one embodiment of the present invention, the block copolymers synthesized can be dried for a time period within the range of from about 0.5 hours to about 20 hours at a temperature within the range of from about 100° C. to about 180° C. and a pressure within the range of from about 0.1 torr to about 5 torts to remove residual monomers from the block copolymer mass. In another embodiment of the present invention, an extruder is used to continuously produce the environmentally degradable block copolymers and devolatilization of the monomers from the polymerization mass is accomplished using a devolatilization zone in the reactor itself as is taught in the art, i.e., through the use of vents and reduced pressures in the extruder.

Importantly, the physical properties of the environmentally degradable block copolymers produced varies widely and can be selectively controlled, as previously described. As a result, the environmentally degradable block copolymers synthesized according to the method of the present invention are suitable for use as a substitute for other, environmentally non-degradable polymers, including, but not limited to, high density polyethylene, low density polyethylene, and polyvinyl chloride. For example, as shown in FIG. 2, a degradable block copolymer of about 60 mole % lactide and about 40 mole % ε-caprolactone, synthesized using a pre-copolymer of lactide and ε-caprolactone has a tensile modulus of about 40 kpsi to about 50 kpsi, which is within the range of the tensile moduli for high density polyethylene (about 60 kpsi) and low density polyethylene (about 30 kpsi).

In addition to the synthesis and purification of the environmentally degradable block copolymers, the synthesized block copolymers can be further processed using conventional polymer processing techniques to obtain a product, such as, plastic bags, packaging films and solid cast, molded or extruded articles. It is preferred, however, that the environmentally degradable block copolymers synthesized according to the methods of the present invention can be injected, rolled, blown, cast or pressed into films for use as plastic bags and packaging materials. As a result of the high melt strength which can be obtained with star-shaped environmentally degradable polymers synthesized according to the present invention, the block copolymers of the present invention are particularly well-suited for use in blow molding applications.

Reference is now made to the following examples, which are intended to illustrate, and not to limit the present invention. Unless otherwise noted, all reaction times given are for the polymerization to go to completion, which was estimated to be when the polymerization mass reached maximum melt viscosity. In addition, the residual monomer contents of the polymerization masses were determined by gas chromatography, and the $M_n$ and $M_w$ of the environmentally degradable block copolymers were obtained by gel permeation chromatography.

EXAMPLES

COMPARATIVE EXAMPLE 1

The following comparative example illustrates the production of an environmentally degradable block copolymer of ε-caprolactone and a lactide without use of a polymerization accelerant in the second polymerization step.

ε-caprolactone, purchased from Aldrich Chemical Company was distilled in a vacuum over $CaH_2$ and stored in an argon gas environment. A 140 g sample of the ε-caprolactone thus prepared was charged to a Haake Rheomix 3000 polymerization reactor along with 0.275 g of stannous octoate, $Sn(Oct_2)$ obtained from Sigma Chemical Company, to give a molar ratio of ε-caprolactone:stannous octoate of about 1,472:1, and was reacted at 180° C. and atmospheric pressure using a mixing rate of 36 rpm. During the polymerization reaction, 9 g of polymer samples were taken from the reactor for analysis.

After 25 minutes, when the melt viscosity reached its maximum, L-lactide purchased from Purac Biochem, Gorinchem (Holland), which had been stored in an argon gas environment after purchase, was added to the polymerization reactor in order to give a polymerization mass concentration of ε-caprolactone of about 35.7 mole % and a total polymer:catalyst molar ratio of 4,280:1, based on total ε-caprolactone and lactide. The reaction was continued at the same temperature, pressure and mixing rate for an additional 110 minutes, until the melt viscosity reached its maximum. The resulting block copolymer had an ε-caprolactone concentration of 36.7 mole % (obtained through NMR analysis). The block copolymer produced was pale yellow in color.

Figure 7:
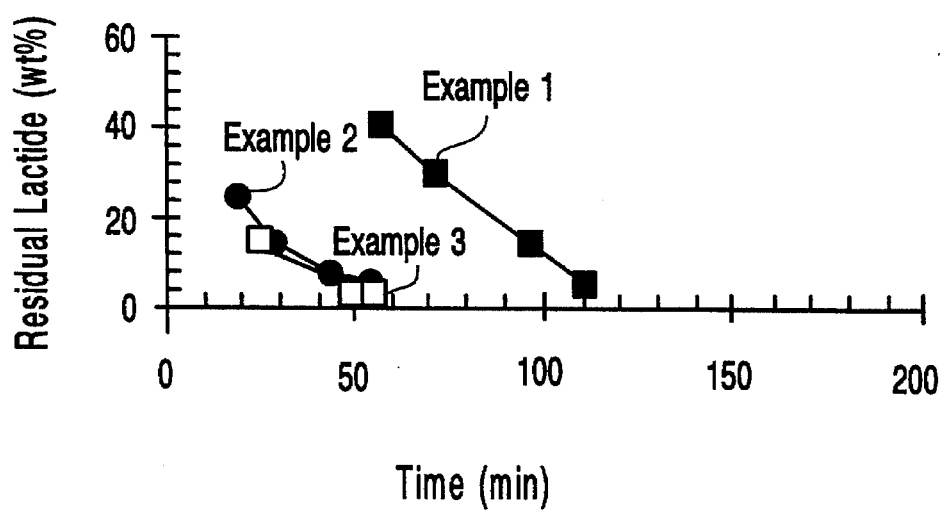
FIG. 7 is a graphical representation of the effect of the use of a polymerization accelerant in the second polymerization step according to the method of the present invention.

Table 1 below lists the results of the block copolymerization. The block copolymerization took a total of 135 minutes. The rate of lactide polymerization is shown graphically in FIG. 7.

TABLE 1

| Reactor Feed | Time (Minutes) | Residual Monomer (wt %) | | $M_n$ | $M_w$ |
| --- | --- | --- | --- | --- | --- |
| | | ε-caprolactone | Lactide | | |
| ε-Caprolactone & | 10 | 23.37 | — | 86,065 | 151,925 |
| $Sn(Oct)_2$ | 15 | 7.71 | — | 86,956 | 171,826 |
| | 20 | 4.64 | — | 78,641 | 166,939 |
| | 25 | 3.14 | — | 89,726 | 164,363 |
| L-Lactide | 55 | 0.90 | 40.44 | 111,959 | 174,944 |
| Added | 70 | 0.87 | 29.31 | 109,234 | 184,038 |
| | 95 | 0.67 | 13.71 | 122,390 | 201,975 |
| | 110 | 0.56 | 5.19 | 109,190 | 197,654 |

EXAMPLE 2

The following example illustrates the increased polymerization rate of the second polymer-forming material obtainable by the addition of catalyst and polymerization accelerant in the second polymerization step according to the present invention.

A 124.2 g sample of $\epsilon$-caprolactone prepared as described in the Example 1 was charged to a Haake Rheomix 3000 polymerization reactor along with stannous octoate to give a molar ratio of $\epsilon$-caprolactone:stannous octoate of about 3000:1. The $\epsilon$-caprolactone was polymerized in the polymerization reactor at a temperature of 180° C. and atmospheric pressure using a mixing rate of 36 rpm. During the polymerization, 14 g of polymer samples were taken from the reactor for analysis.

After 32 minutes, L-lactide, was added to the polymerization reactor to give total concentration of $\epsilon$-caprolactone in the polymerization mass of about 35.7 mole %. At the same time, stannous octoate and poly($\epsilon$-caprolactone) triol were added to the polymerization reactor in a molar ratio of monomer:stannous octoate:[OH] concentration (based on poly($\epsilon$-caprolactone) triol) of about 5,000:1:6. Polymerization was continued at the same temperature, pressure and mixing rate for an additional 53 minutes. The $\epsilon$-caprolactone concentration in the resulting block copolymer was measured to be 36.5 mole % (by NMR analysis) and the total molar ratio of monomer:stannous octoate:[OH] concentration was 4,038/1/2.2, based on total $\epsilon$-caprolactone and lactide. The block copolymer produced was colorless.

The results of the polymerization are shown below in Table 2. The overall block copolymerization took about 83 minutes. The rate of lactide polymerization is shown graphically in FIG. 7. The rate of lactide polymerization in this Example 2 is greatly enhanced relative to the rate of lactide polymerization for Comparative Example 1 due to the addition of polymerization accelerant in the second polymerization in Example 2.

EXAMPLE 3

The following example illustrates the increased polymerization rate of the second polymer-forming material obtainable by the addition of catalyst and polymerization accelerant in the second polymerization step according to the present invention.

A 110 g sample of $\epsilon$-caprolactone prepared as described in Example 1 was charged to a Haake Rheomix 3000 polymerization reactor along with stannous octoate to give a molar ratio of $\epsilon$-caprolactone:stannous octoate of about 3,000:1. The $\epsilon$-caprolactone was polymerized in the polymerization reactor at a temperature of 180° C. and atmospheric pressure using a mixing rate of 36 rpm. During the polymerization, 5 g of polymer samples were taken from the reactor for analysis.

After 36 minutes, L-lactide, was added to the polymerization reactor to give total concentration of $\epsilon$-caprolactone in the polymerization mass of about 35.7 mole %. At the same time, stannous octoate and glycerol were added to the polymerization reactor in a molar ratio of monomer: stannous octoate:[OH] concentration (based on glycerol) of about 5,000/1/9. Polymerization was continued at the same temperature, pressure and mixing rate for an additional 54 minutes. The $\epsilon$-caprolactone concentration in the resulting block copolymer was measured to be 37.8 mole % (by NMR analysis) and the total molar ratio of monomer:stannous octoate:[OH] concentration was 4,032/1/3.2, based on total $\epsilon$-caprolactone and lactide. The block copolymer produced was colorless.

The results of the polymerization are shown below in Table 3. The total block copolymerization took about 89 minutes. The rate of lactide polymerization is shown graphically in FIG. 7. The rate of lactide polymerization in this Example 3 is greatly enhanced relative to the rate of lactide polymerization for Comparative Example 1 due to the addition of polymerization accelerant in the second polymerization in Example 3.

TABLE 2

| Reactor Feed | Time (Minutes) | Residual Monomer (wt %) $\epsilon$-caprolactone | Lactide | $M_n$ | $M_w$ |
| --- | --- | --- | --- | --- | --- |
| $\epsilon$-Caprolactone & Sn(Oct)$_2$ | 30 | 13.97 | — | 61,945 | 126,074 |
| L-Lactide & Sn(Oct)$_2$ & Poly($\epsilon$-caprolactone) triol Added | 18 | 3.15 | 24.89 | 101,929 | 152,727 |
| | 28 | 2.91 | 13.92 | 91,143 | 158,325 |
| | 43 | 2.62 | 7.48 | 106,944 | 171,975 |
| | 53 | 2.27 | 5.01 | 89,289 | 162,821 |

TABLE 3

| Reactor Feed | Time (Minutes) | Residual Monomer (wt %) $\epsilon$-caprolactone | Lactide | $M_n$ | $M_w$ |
| --- | --- | --- | --- | --- | --- |
| $\epsilon$-Caprolactone & Sn(Oct)$_2$ | 35 | 13.69 | — | 73,038 | 131,473 |
| L-Lactide & Sn(Oct)$_2$ & Glycerol Added | 24 | 3.26 | 15.12 | 81,278 | 138,158 |
| | 49 | 3.12 | 3.12 | 99,654 | 154,905 |
| | 54 | 1.86 | 2.60 | 77,927 | 143,915 |

COMPARATIVE EXAMPLE 4

The following comparative example illustrates the properties of an environmentally degradable block copolymer having an ε-caprolactone concentration of about 50 mole %.

A 150.4 g of ε-caprolactone prepared as described in Example 1 was charged to a Haake Rheomix 3000 polymerization reactor along with stannous octoate and glycerol to give a molar ratio of monomers:stannous octoate:[OH] concentration (based on glycerol) of about 3,000/1/7.5. The ε-caprolactone monomer was polymerized at 180° C. and at atmospheric pressure using a mixing rate of 35 rpm. During this period of polymerization, about 6 g of samples were taken for analysis.

After 22 minutes, 179.5 g of L-lactide was added to the polymerization reactor to give a total concentration of ε-caprolactone in the polymerization mass of about 50 mole %. Polymerization was continued at the same temperature, pressure and mixing rate for an additional 115 minutes. The ε-caprolactone concentration in the resulting block copolymer was measured to be 51.1 mole % (by NMR analysis) and the total molar ratio of monomers:stannous octoate:[OH] concentration was 6,000/1/3.8. The results of polymerization are shown below in Table 4. The block copolymer produced was pale yellow in color.

The entire block copolymerization took about 180 minutes. The block copolymer exhibited a $T_g$ at −52.4° C., corresponding to the glass transition of the poly(ε-caprolactone) soft phase. The polylactide hard phase of the block copolymer exhibited a melting temperature of 140.1° C. with ΔH of 22.74 J/g, measured by differential scanning calorimeter. The melting peak of soft phase overlapped the $T_g$ of the hard phase; both were at about 50° C. Tensile testing of the block copolymer yielded the following: tensile modulus, 161 kpsi; stress at break, 5536 psi; elongation at break, 624%.

using a mixing rate of 36 rpm to form a random copolymer of ε-caprolactone and L-lactide. During this period of polymerization, about 10 g of sample was taken for analysis.

After 65 minutes, 136 g of L-lactide was added to the polymerization reactor to give a total concentration of ε-caprolactone in the polymerization mass of about 50 mole %. At the same time, stannous octoate and glycerol were added to the reactor in a molar ratio of monomers:stannous octoate:[OH] concentration of about 4,250/1/8.8. Polymerization was continued at the same temperature, pressure and mixing rate for an additional 35 minutes. The ε-caprolactone concentration in the resulting block copolymer was measured to be 49.4 mole % (by NMR analysis) and the total molar ratio of monomers:stannous octoate:[OH] concentration was 4,245/1/7.5. The results of polymerization are shown below in Table 5. The block copolymer produced was colorless and nearly transparent, probably as a result of the reduced crystallinity of the soft phase.

The block copolymerization took about 100 minutes. The block copolymer showed two $T_g$'s at −36.3 and 52.1° C., corresponding to the glass transitions of the ε-caprolactone-rich soft phase and the L-lactide-rich hard phase, respectively. A melting temperature of 159.6° C. with ΔH of 6.49 J/g, measured by differential scanning calorimeter corresponds to the melting point of the hard phase. The melting peak of the soft phase was not observed because the crystallinity of the poly(ε-caprolactone) in the soft phase was substantially reduced by copolymerization with 20 mole % L-lactide. Tensile testing was conducted with the following results: Young's tensile modulus, 11.3 kpsi; stress at break, 1712 psi; elongation at break, 620%.

Notably, the overall ε-caprolactone concentrations are nearly the same for the block copolymers synthesized in Examples 4 and 5. However, the block copolymer formed in Example 5 was much softer than that formed in Example 4, with Young's tensile modulus of 11.3 kpsi and 161 kpsi,

TABLE 4

| Reactor Feed | Time (Minutes) | Residual Monomer (wt %) ε-caprolactone | Residual Monomer (wt %) Lactide | $M_n$ | $M_w$ |
| --- | --- | --- | --- | --- | --- |
| ε-caprolactone, Sn(Oct)$_2$, glycerol | 10 | 14.16 | | 59,429 | 103,077 |
| | 16 | 2.54 | | 57,962 | 118,270 |
| | 22 | 1.34 | | 64,961 | 118,353 |
| L-Lactide added | 43 | 0.46 | 48.05 | 60,501 | 122,900 |
| | 68 | 0.45 | 33.36 | 73,253 | 132,430 |
| | 98 | 0.45 | 15.9 | 83,654 | 144,448 |
| | 138 | 0.45 | 11.33 | 90,151 | 167,125 |
| | 158 | 0.48 | 5.28 | 90,145 | 163,974 |

EXAMPLE 5

The following example illustrates the synthesis of an environmentally degradable block copolymer with an overall feed ε-caprolactone concentration of about 50 mole %, and synthesized using an 80:20 molar ratio mixture of ε-caprolactone:L-lactide as the first polymer-forming material.

A mixture of 152.68 g of ε-caprolactone prepared as described in Example 1 and 48 g of L-lactide, resulting in a mixture of ε-caprolactone:L-lactide having the molar ratio 80:20, was charged to a Haake Rheomix 3000 polymerization reactor along with stannous octoate and glycerol to give a molar ratio of monomers:stannous octoate:[OH] concentration (based on glycerol) of about 4,240/1/6.6. The monomers were polymerized at 180° C. and atmospheric pressure respectively. The differences in the moduli are probably also due to the elimination of crystallinity of the soft phase in Example 5.

TABLE 5

| Reactor Feed | Time (Minutes) | Residual Monomer (wt %) | | $M_n$ | $M_w$ |
| --- | --- | --- | --- | --- | --- |
| | | ε-caprolactone | Lactide | | |
| ε-caprolactone, L-lactide, Sn(Oct)$_2$, glycerol | 35 | 40.8 | 3.21 | 42,491 | 76,976 |
| | 45 | 23.49 | 1.80 | 54,688 | 110,735 |
| | 55 | 8.75 | 0.69 | 71,331 | 137,217 |
| | 65 | 3.84 | 0.62 | 70,775 | 140,546 |
| L-lactide, Sn(Oct)$_2$, glycerol | 10 | 1.81 | 12.93 | 81,021 | 139,928 |
| | 25 | 1.87 | 5.72 | 85,763 | 151,564 |
| | 35 | 1.67 | 5.20 | 81,282 | 147,171 |

The foregoing disclosure of the present invention has been presented for purposes of illustration and description. The description is not intended to limit the invention to the form disclosed herein. Consequently, the invention and modifications commensurate with the above teachings and skill and knowledge of the relevant art are within the scope of the present invention. The preferred embodiment described above is also intended to explain the best mode known of practicing the invention and to enable others skilled in the art to utilize the invention in various embodiments and with the various modifications required by their particular applications for use of the invention. It is intended that the appended claims be construed to include all alternative embodiments as permitted by the prior art.

What is claimed is:

1. A method for synthesizing an environmentally degradable block copolymer, the method comprising the steps of:
    (a) polymerizing a first polymer-forming material selected from the group consisting of lactones, cyclic esters of hydroxycarboxylic acids, trimethylene carbonates, alkylene oxides and mixtures thereof, in the presence of a first polymerization accelerant and a first catalyst to form a first polymer;
    (b) combining said first polymer with a second polymer-forming material selected from the group consisting of cyclic esters of hydroxycarboxylic acids and mixtures thereof and a second polymerization accelerant, which can be the same as or different from said first polymerization accelerant, and a second catalyst, which can be the same as or different from said first catalyst; and
    (c) polymerizing said second polymer-forming material to form said environmentally degradable block copolymer.

2. The method as claimed in claim 1, wherein said environmentally degradable block copolymer has soft segments of said first polymer and hard segments of a polymer comprising repeating units of said second polymer-forming material.

3. The method as claimed in claim 1, wherein said steps of polymerizing comprise melt polymerization.

4. The method as claimed in claim 3, wherein said step of melt polymerizing is accomplished using an extruder.

5. The method as claimed in claim 4, wherein said extruder comprises a twin screw extruder.

6. The method as claimed in claim 1, wherein said second polymerization accelerant and said second catalyst comprise an additional amount of said first polymerization accelerant and said first catalyst.

7. The method as claimed in claim 1, wherein said first and second polymerization accelerants are selected from the group consisting of alcohols, amino alcohols, diols, polyols, monoamino compounds, polyamino compounds and mixtures thereof.

8. The method as claimed in claim 1, wherein said first and said second catalysts comprise a metal catalyst selected from the group consisting of tin, aluminum, yttrium and lanthanum based metal catalysts.

9. The method as claimed in claim 1, wherein said first polymerization accelerant and said second polymerization accelerant are selected from the group consisting of glycerol and poly(ε-caprolactone) triol.

10. The method as claimed in claim 9, wherein said first catalyst and said second catalyst comprise stannous octoate.

11. The method as claimed in claim 1, wherein said first polymer-forming material comprises ε-caprolactone and said second polymer-forming material comprises lactide.

12. The method as claimed in claim 1, wherein said first polymer comprises a copolymer of a lactone and a cyclic ester of a hydroxycarboxylic acid.

13. The method as claimed in claim 1, wherein said first polymer-forming material comprises a copolymer of ε-caprolactone and lactide.

14. The method as claimed in claim 13, wherein said second polymer-forming material comprises lactide.

15. The method as claimed in claim 14, wherein said second polymer-forming material comprises L-lactide and D-lactide.

16. The method as claimed in claim 1, wherein said second polymer-forming material comprises L-lactide and ε-caprolactone.

17. The method as claimed in claim 1, wherein said first polymer-forming material comprises ε-caprolactone and said second polymer-forming material comprises glycolide.

18. The method as claimed in claim 1, wherein said steps of polymerizing said first polymer-forming material and polymerizing said second polymer-forming material are carried out for a combined time of less than about 3 hours.

19. The method as claimed in claim 1, wherein said steps of polymerizing said first polymer-forming material and polymerizing said second polymer-forming material are carried out at temperatures within the range of from about 150° C. to about 210° C.

20. The method as claimed in claim 1, wherein said environmentally degradable block copolymer comprises ε-caprolactone in the range of from about 5 mole % to about 50 mole %.

21. The method as claimed in claim 1, wherein said environmentally degradable block copolymer is selected from the group consisting of star-shaped and branched environmentally degradable block copolymers.

22. The method as claimed in claim 1, wherein said environmentally degradable block copolymer has a weight average molecular weight ($M_w$) in the range of from about 120,000 to about 300,000.

23. The method as claimed in claim 1, wherein said environmentally degradable block copolymer has a number average molecular weight ($M_n$) in the range of from about 60,000 to about 150,000.

24. The method as claimed in claim 1, comprising the further step of manufacturing a blown film from said environmentally degradable block copolymer.

25. The method as claimed in claim 1, wherein said method for synthesizing an environmentally degradable block copolymer further comprises selectively controlling said method to produce a copolymer which has physical characteristics such that it can be used as a substitute for other, non-degradable polymers selected from the group consisting of high density polyethylene, low density polyethylene and polyvinyl chloride.

26. A method for synthesizing an environmentally degradable block copolymer, the method comprising the steps of:

(a) melt polymerizing ε-caprolactone in the presence of a polymerization accelerant and a catalyst at a temperature within the range of from about 150° C. to about 210° C. for a time period of less than about 65 minutes to form a poly(ε-caprolactone) polymer;

(b) mixing said poly(ε-caprolactone) polymer with an amount of a polymer-forming material selected from the group consisting of lactide, glycolide and mixtures thereof and an additional amount of said polymerization accelerant and an additional amount of said catalyst, such that the resulting mixture comprises from about 50 mole % to about 95 mole % said polymer-forming material; and (c) melt polymerizing said polymer-forming material at a temperature within the range of from about 150° C. to about 210° C. for a time period of less than about two hours to form an environmentally degradable block copolymer.

27. The method as claimed in claim 26, wherein said step of melt polymerizing is accomplished using a twin screw extruder.

28. The method as claimed in claim 26, wherein said polymerization accelerant is selected from the group consisting of alcohols, amino alcohols, diols, polyols, monoamino compounds, polyamino compounds and mixtures thereof.

29. The method as claimed in claim 26, wherein said catalyst comprises a metal catalyst selected from the group consisting of tin, aluminum, yttrium and lanthanum based metal catalysts.

30. The method as claimed in claim 26, wherein said environmentally degradable block copolymer has a weight average molecular weight ($M_w$) in the range of from about 120,000 to about 300,000.

31. The method as claimed in claim 26, wherein said environmentally degradable block copolymer has a number average molecular weight ($M_n$) in the range of from about 60,000 to about 150,000.

32. The method as claimed in claim 26, comprising the further step of manufacturing a blown film from said environmentally degradable block copolymer.

33. The method as claimed in claim 26, wherein said method for synthesizing an environmentally degradable block copolymer further comprises selectively controlling said method to produce a copolymer which has physical characteristics such that it can be used as a substitute for other, non-degradable polymers selected from the group consisting of high density polyethylene, low density polyethylene and polyvinyl chloride.

34. The method as claimed in claim 26, wherein said steps of melt polymerizing are carried out for a combined time of less than about 3 hours.

35. A method for synthesizing an environmentally degradable block copolymer, the method comprising the steps of:

(a) providing a first environmentally degradable polymer-forming material having a glass transition temperature of less than about 10° C. to a polymerization reactor;

(b) polymerizing said environmentally degradable first polymer-forming material in the presence of a first catalyst and a first polymerization accelerant comprising a hydrogen-labile compound to form a first polymer;

(c) combining a second polymer-forming material comprising a cyclic ester of a hydroxycarboxylic acid with said first polymer; and (d) polymerizing said second polymer-forming material in the presence of a second catalyst, which can be the same as or different from said first catalyst, and a second polymerization accelerant comprising a hydrogen-labile compound, which can be the same as or different from said first polymerization accelerant, to form said environmentally degradable block copolymer.

36. The method as claimed in claim 35, wherein said first polymer-forming material comprises ε-caprolactone.

37. The method as claimed in claim 35, wherein said cyclic ester of a hydroxycarboxylic acid comprises lactide.

38. The method as claimed in claim 37, wherein said lactide comprises L-lactide and D-lactide.

39. The method as claimed in claim 35, wherein said steps of polymerizing comprise melt polymerization.

40. The method as claimed in claim 39, wherein said step of melt polymerizing is accomplished using an extruder.

41. The method as claimed in claim 35, wherein said second polymerization accelerant and said second catalyst comprise an additional amount of said first polymerization accelerant and said first catalyst.

42. The method as claimed in claim 35, wherein said first and second polymerization accelerants are selected from the group consisting of alcohols, amino alcohols, diols, polyols, monoamino compounds, polyamino compounds, and mixtures thereof.

43. The method as claimed in claim 35, wherein said first and second polymerization accelerants comprise polyols.

44. The method as claimed in claim 35, wherein said first and second catalysts comprise a metal catalyst selected from the group consisting of tin, aluminum, yttrium and lanthanum based metal catalysts.

45. The method as claimed in claim 35, wherein said environmentally degradable block copolymer comprises a block copolymer of ε-caprolactone and lactide.

46. The method as claimed in claim 35, wherein said environmentally degradable block copolymer comprises a star-shaped environmentally degradable block copolymer.

47. The method as claimed in claim 35, comprising the further step of manufacturing a blown film from said environmentally degradable block copolymer.

48. The method as claimed in claim 35, wherein said method for synthesizing an environmentally degradable block copolymer further comprises selectively controlling said method to produce a copolymer which has physical characteristics such that it can be used as a substitute for other, non-degradable polymers selected from the group consisting of high density polyethylene, low density polyethylene and polyvinyl chloride.

49. An environmentally degradable block copolymer comprising from about 5 mole % to about 50 mole % hard segments of a polymer of ε-caprolactone and from about 50 mole % to about 95 mole % soft segments of a polymer having repeating units of a material selected from the group consisting of lactide and glycolide, wherein said block copolymer is substantially colorless.

50. A plastic bag comprising the environmentally degradable block copolymer claimed in claim 49.

51. The environmentally degradable block copolymer claimed in claim 49, wherein said block copolymer has physical characteristics such that it can be used as a substitute for other, non-degradable polymers selected from the group consisting of high density polyethylene, low density polyethylene and polyvinyl chloride.

* * * * *